US010853666B2

(12) United States Patent
Uchida et al.

(10) Patent No.: US 10,853,666 B2
(45) Date of Patent: Dec. 1, 2020

(54) TARGET OBJECT ESTIMATING APPARATUS

(71) Applicants: TOYOTA JIDOSHA KABUSHIKI KAISHA, Toyota (JP); DENSO CORPORATION, Kariya (JP)

(72) Inventors: Naohide Uchida, Numazu (JP); Ken Tanabe, Kariya (JP); Hirotake Ishigami, Okazaki (JP); Masaki Kuwahara, Nukata-gun (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 137 days.

(21) Appl. No.: 16/145,346

(22) Filed: Sep. 28, 2018

(65) Prior Publication Data

US 2019/0102633 A1 Apr. 4, 2019

(30) Foreign Application Priority Data

Sep. 29, 2017 (JP) ................................ 2017-191563

(51) Int. Cl.
*G06K 9/00* (2006.01)
*G06T 7/73* (2017.01)
(Continued)

(52) U.S. Cl.
CPC .......... *G06K 9/00798* (2013.01); *G06T 7/285* (2017.01); *G06T 7/292* (2017.01);
(Continued)

(58) Field of Classification Search
None
See application file for complete search history.

(56) References Cited

U.S. PATENT DOCUMENTS 5,892,855 A * 4/1999 Kakinami ............ G06K 9/4633
348/119
6,366,221 B1 * 4/2002 Iisaka .................... B60Q 9/005
180/204
(Continued)

FOREIGN PATENT DOCUMENTS

JP 2006236104 A * 9/2006 ......... G06K 9/00805
JP 3897337 B2 * 3/2007
(Continued)

OTHER PUBLICATIONS

Multi-Camera real-time—animals, Andrew D. Straw et al., JRSI, 2011, pp. 395-409 (Year: 2011).*
(Continued)

*Primary Examiner* — Jayesh A Patel
(74) *Attorney, Agent, or Firm* — Sughrue Mion, PLLC

(57) ABSTRACT

A target object estimating apparatus comprises parallax information calculating means for calculating parallax information including a parallax between corresponding pixels of taken images taken at a same computation timing, road surface region detecting means for detecting a road surface region in the taken image based on the parallax information, road surface region determining means for determining whether or not each pixel in the taken image corresponds to the road surface region, transition information calculating means for calculating transition information including a change amount of a position of each pixel, using temporally sequential taken images, and estimated value calculating means for estimating a position and a speed of a target object by calculating, based on the parallax/transition information, estimated values of the position and the speed of each pixel. The estimated value calculating means does not calculate the estimated values for a pixel determined to correspond to the road surface region.

9 Claims, 5 Drawing Sheets

(51) Int. Cl.
*G06T 7/292* (2017.01)
*G06T 7/285* (2017.01)

(52) U.S. Cl.
CPC ...... *G06T 7/73* (2017.01); *G06T 2207/30248* (2013.01); *G06T 2207/30261* (2013.01)

(56) References Cited

U.S. PATENT DOCUMENTS

| | | | | |
|---|---|---|---|---|
| 6,590,521 | B1* | 7/2003 | Saka | G01S 13/867 342/70 |
| 7,571,051 | B1* | 8/2009 | Shulman | G01C 11/00 348/142 |
| 8,126,209 | B2* | 2/2012 | Sasakawa | G08G 1/0962 382/104 |
| 10,139,827 | B2* | 11/2018 | Charette | G08B 13/19613 |
| 2002/0027503 | A1* | 3/2002 | Higuchi | G05D 1/0257 340/436 |
| 2002/0159616 | A1* | 10/2002 | Ohta | G06K 9/00798 382/104 |
| 2009/0028384 | A1* | 1/2009 | Bovyrin | G06K 9/00 382/103 |
| 2009/0195774 | A1* | 8/2009 | Kawakami | G06T 7/285 356/73 |
| 2012/0288154 | A1* | 11/2012 | Shima | G06T 7/11 382/103 |
| 2016/0203376 | A1* | 7/2016 | Ishigami | G06T 7/292 382/103 |
| 2016/0232412 | A1* | 8/2016 | Nishijima | G06K 9/00791 |
| 2016/0253575 | A1* | 9/2016 | Kakegawa | G06K 9/6212 701/70 |
| 2016/0305785 | A1* | 10/2016 | Nishijima | G06K 9/00798 |
| 2016/0307055 | A1* | 10/2016 | Nishijima | H04N 13/106 |
| 2017/0124725 | A1* | 5/2017 | Sumiyoshi | H04N 13/239 |
| 2017/0371339 | A1* | 12/2017 | Charette | G05D 1/0088 |

FOREIGN PATENT DOCUMENTS

| | | | | |
|---|---|---|---|---|
| JP | 201055340 A | * | 3/2011 | |
| JP | 2015-041238 A | | 3/2015 | |
| JP | 2015041238 A | * | 3/2015 | ......... G06K 9/00335 |
| JP | 2016-206776 A | | 12/2016 | |

OTHER PUBLICATIONS

I. Haller et al., "Real-time semi-global dense stereo solution with improved sub-pixel accuracy", 2010 IEEE Intelligent Vehicles Symposium, University of California, Jun. 21-24, 2010, pp. 369-376, San Diego, CA, USA.

Simon Baker et al., "Lucas-Kanade 20 Years On: A Unifying Framework", International Journal of Computer Vision, 2004, pp. 221-255, vol. 56, No. 3.

* cited by examiner

TARGET OBJECT ESTIMATING APPARATUS

TECHNICAL FIELD

The present invention relates to a target object estimating apparatus for estimating a position and a speed of a target object in a taken image acquired by taking an image in front of a vehicle.

BACKGROUND ART

A technique for estimating a position and a speed of a target object (typically, a pedestrian, an other vehicle, and the like) existing in front of a vehicle and performing, based on the position and the speed estimated, a control (a collision avoidance control) for avoiding a collision with the target object and/or reducing an impact due to the collision has been conventionally known.

The Japanese Patent Application Laid-Open (kokai) No. 2015-41238 discloses a target object estimating apparatus (hereinafter, referred to as a "prior art apparatus") for taking an image in front of a vehicle by means of a stereo camera and estimating a three-dimensional position and a speed of a target object in the taken picture. The prior art apparatus calculates a parallax of each of pixels in the taken image as well as calculates a change amount (an optical flow) of a position of each of the pixels using temporally sequential taken images acquired by a same camera. The prior art apparatus estimates a position and a speed of a target object by applying Kalman filter with an input of the parallax and the optical flow.

Specifically, the prior art apparatus calculates estimated values of a position and a speed for each of the pixels in the taken image and determines, based on the estimated values calculated, whether or not to execute a grouping of the pixels. When having determined to execute the grouping, the prior art apparatus determines that these pixels of which the grouping has been executed correspond to one target object.

For example, in a case where the pixels, a deviation of speeds thereof being in a predetermined speed range are positioned in a predetermined distance range, the prior art apparatus determines that these pixels correspond to one target object. Thereby, the prior art apparatus estimates a position and a speed of the target object.

SUMMARY OF THE INVENTION

That is, at a point in time when estimated values of a position and a speed are calculated for each of the pixels in the taken image, it is unclear whether or not each of the pixels is a pixel corresponding to a target object. Therefore, the prior art is required to calculate estimated values for almost all the pixels in the taken image, causing a problem that a computational load increases. This problem becomes more remarkable as a resolution of the stereo camera becomes high and a number of pixels increases.

The present invention is made to resolve the problem above. That is, one of objects of the present invention is to provide a technique capable of reducing a computational load while preventing an occurrence of a target object, a position and a speed thereof not being estimated (a leakage of an estimation of a target object) for a target object estimating apparatus configured to estimate a position and a speed of the target object in a taken image.

A target object estimating apparatus according to the present invention (Hereinafter, this apparatus will be referred to as a "present invention apparatus".) is mounted on a vehicle.

This present invention apparatus comprises;

imaging means (11, step 502) for taking an image of a region in front of the vehicle by means of a stereo camera every time a predetermined time elapses;

parallax information calculating means (step 504) for calculating, on a basis of a reference image which is one of taken images used as a reference, the taken images being taken at a same computation timing by the imaging means (11), parallax information including a parallax (d) between corresponding pixels of the taken images for each of pixels in the reference image every time the predetermined time elapses;

road surface region detecting means (step 514) for detecting a road surface region (14) in the reference image based on the parallax information every time the predetermined time elapses;

road surface region determining means (step 516) for determining whether or not each of the pixels in the reference image is a pixel corresponding to the road surface region (14) every time the predetermined time elapses;

transition information calculating means (step 518) for calculating transition information including a change amount ((u, v)) of a position from a position of a pixel in the reference image at a previous computation timing to a position of a pixel in the reference image at a current computation timing, the pixel at the current computation timing corresponding to the pixel at the previous computation timing, for each of the pixels in the reference image every time the predetermined time elapses; and estimated value calculating means (steps 520, 524) for estimating a position and a speed of a target object by calculating, based on the parallax information and the transition information, estimated values of the position and the speed in a three-dimensional space of each of the pixels in the reference image by means of a filter every time the predetermined time elapses.

when it is determined (step 516: Yes) by the road surface region determining means that a pixel in the reference image is a pixel corresponding to the road surface region (14), the estimated value calculating means is configured not to calculate the estimated values for the determined pixel.

In a region of the reference image detected as a road surface region, a target object does not exist. Therefore, it is impossible to estimate a position and a speed of a target object by calculating estimated values of a position and a speed of a pixel corresponding to the road surface region. Hence, the present invention apparatus detects a road surface region in the reference image and does not calculate estimated values for a pixel corresponding to the road surface region. That is, the present invention apparatus calculates estimated values only for a pixel corresponding to a region other than the road surface region in the reference image. By removing "a region where it is obvious that a target object does not exist" from the reference image as described above, an area in the reference image where estimated values are to be calculated (in other words, the number of pixels) can be reduced. As a result, it becomes possible to reduce a computational load while preventing an occurrence of a target object, a position and a speed thereof not being estimated (that is, a leakage of an estimation of a target object).

In addition, in another aspect of the present invention apparatus, when it is determined (step 516: Yes) by the road surface region determining means that a pixel in the reference image is a pixel corresponding to the road surface region (14), the transition information calculating means is configured not to calculate the transition information for the determined pixel.

According to this configuration, the present invention apparatus calculates the transition information only for a pixel corresponding to a region other than the road surface region in the reference image, and therefore it becomes possible to further reduce a computational load while preferably calculating estimated values of a pixel in the reference image.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1:
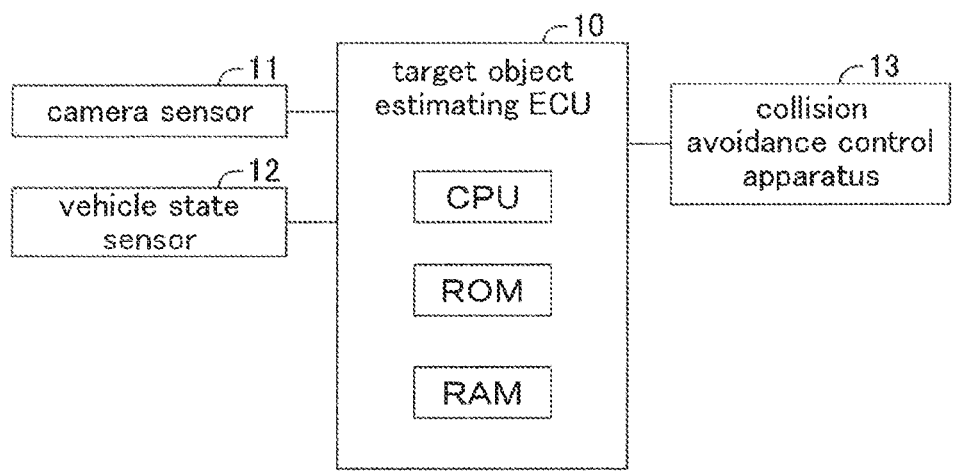
FIG. 1 is a schematic configuration diagram of a target object estimating apparatus (hereinafter, referred to as an "embodiment apparatus") according to an embodiment of the present invention and a collision avoidance control apparatus connected to the embodiment apparatus.

FIG. 1 is a schematic configuration diagram of a target object estimating apparatus (hereinafter, referred to as an "embodiment apparatus") according to an embodiment of the present invention and a collision avoidance control apparatus connected to the embodiment apparatus. Hereinafter, a vehicle on which the embodiment apparatus is mounted is referred to as an "own vehicle" in order to distinguish it from other vehicles. The embodiment apparatus estimates a position and a speed of a target object in a taken image acquired by taking an image in front of the own vehicle. It should be noted that a target object means typically a pedestrian, an other vehicle, and the like.

The embodiment apparatus comprises a target object estimating ECU 10, a camera sensor 11 connected to the target object estimating ECU 10, and a vehicle state sensor 12. The target object estimating ECU 10 is connected to a collision avoidance control apparatus 13. ECU is an abbreviation of "Electric Control Unit" and comprises a microcomputer as a main part. The microcomputer includes CPU and storing devices (non-transitory computer-readable storage medium) such as ROM and RAM. The CPU is configured to realize/perform various functions by executing instructions (i.e., programs or routines) stored in the ROM. Hereinafter, the target object estimating ECU 10 is simply referred to as an "ECU 10".

The camera sensor 11 comprises a vehicle-mounted stereo camera apparatus (illustration omitted) for taking an image in front of the own vehicle. The vehicle-mounted stereo camera apparatus is provided in a vicinity of a middle in a vehicle width direction of a front edge part of a roof of the own vehicle, and comprises a left camera arranged at a left side from a vehicle front-rear axis and a right camera arranged at a right side from the vehicle front-rear axis. The left camera mainly takes an image of a front left side region of the own vehicle every time a predetermined time elapses to output a left image signal indicating a taken left image to the ECU 10. Similarly, the right camera mainly takes an image of a front right side region of the own vehicle every time the predetermined time elapses to output a right image signal indicating a taken right image to the ECU 10. It should be noted that the left image and the right mage correspond to one example of "taken images".

The vehicle state sensor 12 is a sensor for acquiring vehicle state information regarding a travelling state of the own vehicle. The vehicle state sensor 12 includes a vehicle speed sensor for detecting a speed of the own vehicle, a yaw rate sensor for detecting a yaw rate of the own vehicle, and the like. The vehicle state sensor 12 outputs the vehicle state information (the vehicle speed and the yaw rate) to the ECU 10 every time the predetermined time elapses.

The ECU 10 detects a road surface region existing in front of the own vehicle every time the predetermined time elapses (that is, every time a predetermined computation interval elapses) by procedures described below. That is, first, the ECU 10 calculates parallax information including a parallax d between corresponding pixels on a basis of the right image among the left image and the right image indicated by the left and the right image signals output from the camera sensor 11 (hereinafter, the right image is also referred to as a "reference image"). Subsequently, the ECU 10 generates a parallax image based on the parallax information. Next, the ECU 10 estimates whether each of pixels composing the parallax image (Hereinafter, each of these pixels may also be referred to as a "parallax point" as will be described later.) is a parallax point corresponding to a road surface region (Hereinafter, such a parallax point is referred to as a "road surface parallax point") or a parallax point corresponding to a region other than the road surface region. Thereafter, the ECU 10 estimates, based on the vehicle state information output from the vehicle state sensor 12, a travelling expected route on which the own vehicle is expected to travel and weights each of the road surface parallax points, depending on a distance thereof to the travelling expected route. Subsequently, the ECU 10 detects a road surface region in the reference image based on the weighted road surface parallax points.

In addition, the ECU 10 calculates transition information including a change amount (hereinafter, also referred to as an "optical flow") of a position of each of the pixels in the reference image, using temporally sequential two reference images every time the predetermined time elapses. Thereafter, the ECU 10 calculates estimated values of a position and a speed of each of the pixels in the reference image by applying Kalman filter with an input of the parallax and the optical flow of each of the pixels in the reference image every time the predetermined time elapses, and thereby estimates the position and the speed of a target object.

It should be noted that the ECU 10 determines, before performing "calculation of the transition information" and "estimation of the position and the speed of a target object", whether or not each of the pixels in the reference image is a pixel corresponding to a road surface region every time the predetermined time elapses. Thereafter, the ECU 10 calculates the transition information by the procedures described above to estimate the position and the speed of a target object only for the pixels corresponding to a region other than the road surface region. The ECU 10 transmits target object information including the estimated position and the estimated speed of the target object to the collision avoidance control apparatus 13 along with an ID identifying the target object. That is, it can be also said that the ECU 10 is target object information acquiring ECU.

The collision avoidance control apparatus 13 determines whether or not to perform a collision avoidance control based on the target object information transmitted from the ECU 10 and the speed and the like transmitted from the vehicle state sensor 12 via the ECU 10. Here, the collision avoidance control is a control to perform at least one of following controls, that is, a warning control for raising a warning to a driver, an automatic braking control for automatically applying a braking force on the own vehicle, and an automatic steering control for automatically changing a steered angle of a steered wheel of the own vehicle. Each of these controls is performed when there exists a target object in front of the own vehicle with a possibility of colliding with the own vehicle. When having acquired the target object information, the collision avoidance control apparatus 13 calculates a time-to-collision to the target object (a time expected to be required for the own vehicle to collide with this obstacle) from the target object information, the vehicle speed of the own vehicle, and the like. When the time-to-collision calculated is less than or equal to a predetermined time threshold, the collision avoidance control apparatus 13 determines that there is a possibility that the own vehicle collides with the target object to perform at least one control of the aforementioned collision avoidance control. On the other hand, when the time-to-collision exceeds the time threshold, the collision avoidance control apparatus 13 determines that a possibility that the own vehicle collides with the target object is extremely and thus does not perform the collision avoidance control.

(Operation Detail)

Next, a detailed description about an operation of the embodiment apparatus will be made. It should be noted that methods from a method for generating a parallax image to a method for detecting a road surface region as will be described below have been already known, and thus only simple descriptions will be made for these methods. For more details, refer to the Japanese Patent Application Laid-Open (kokai) No. 2016-206776 (U.S. Unexamined Patent Application Publication No. 2016305785).

<Generation of a Parallax Image>

The ECU 10 of the embodiment apparatus generates parallax information as follows every time the predetermined time (computation interval) elapses during a period (hereinafter, also referred to as an "engine on period") from a timing at which a non-illustrated engine switch (an ignition key switch) of the own vehicle has been changed into an on state to a timing at which the engine switch is to be changed into an off state. That is, the ECU 10 calculates the parallax information including a parallax d between corresponding pixels of the left image and the right image (the reference image) indicated by the left and the right image signals output from the camera sensor 11 on the basis of the reference image. The ECU 10 calculates the parallax information for all the pixels in the reference image. Here, "all the pixels" means all of pixels in the reference image capable of calculating the parallax information. For example, a method of Semi-Global Matching may be used for generating the parallax information. The ECU 10 generates a parallax image based on the parallax information. Each of pixels (each of parallax points) composing the parallax image is associated with the parallax information. The ECU 10 stores the parallax image generated in the RAM thereof.

<Estimation of a Road Surface Parallax Point>

Figure 2A:
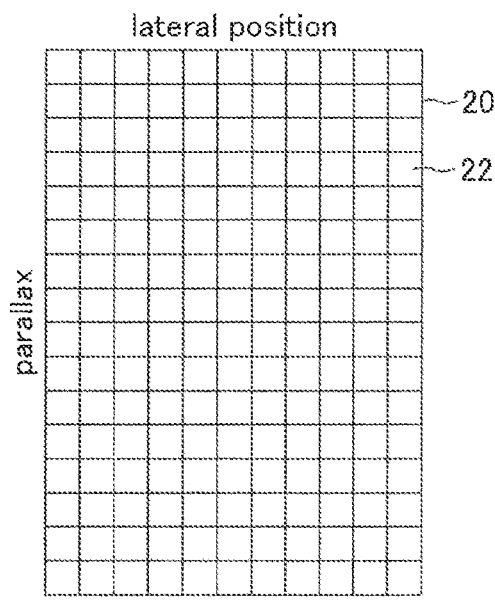
FIG. 2A is a plan view of a parallax vote map.
Figure 2B:
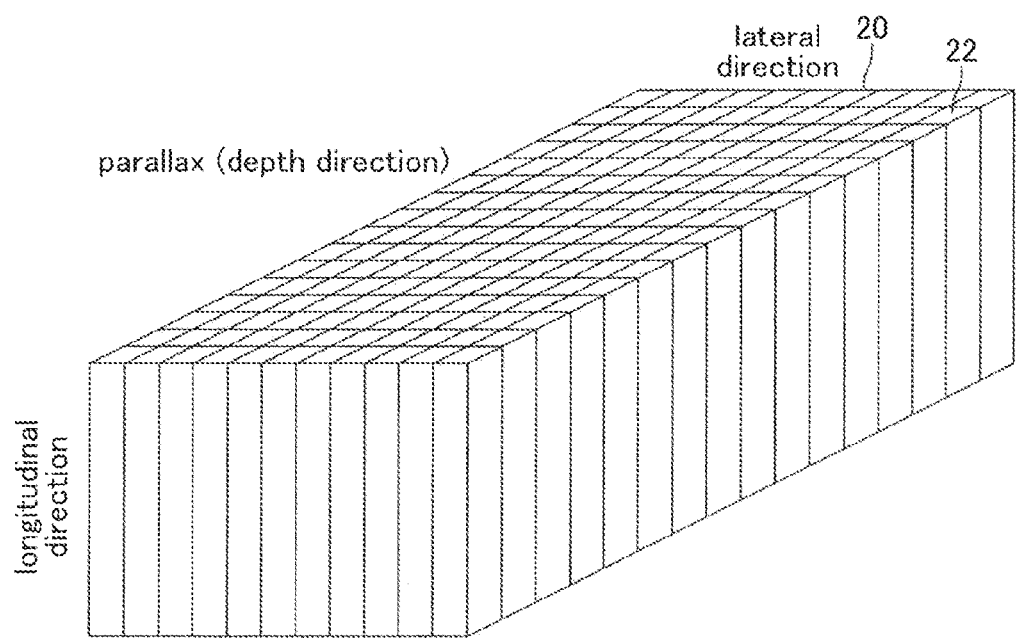
FIG. 2B is a perspective view of the parallax vote map.

The ECU 10 estimates whether each parallax point in the parallax image is a road surface parallax point or a parallax point other than a road surface parallax point every time the predetermined time elapses during the engine on period. Hereinafter, one example of an estimation method will be briefly described. FIG. 2A shows a plan view of a parallax vote map 20, and FIG. 2B shows a perspective view of the parallax vote map 20. The parallax vote map 20 is provided in advance in the RAM. As shown in FIG. 2A and FIG. 2B, the parallax vote map 20 comprises a plurality of rectangular parallelepiped blocks 22 arranged in such a manner that each edge in a lateral direction corresponds to a position in the lateral direction (the vehicle width direction) of the parallax image, each edge in a longitudinal direction corresponds to a position in the longitudinal direction of the parallax image, and each edge in a depth direction corresponds to a magnitude of a parallax.

The ECU 10 sets an attribute of a road surface or an attribute other than a road surface for each of the blocks 22 of the parallax vote map 20. Specifically, the ECU 10 votes (classifies) each of the parallax points in the parallax image to a corresponding block 22 of the parallax vote map 20 based on a position of each of the parallax points (a position in the lateral direction and a position in the longitudinal direction) and a magnitude of each of parallaxes thereof. Thereafter, the ECU 10 calculates, for each of the blocks 22 of the parallax vote map 20, an average value of the parallaxes, a deviation of the parallaxes, an average value of coordinates of the parallax points in the longitudinal direction of the parallax image, and a deviation of coordinates of the parallax points in the longitudinal direction of the parallax image.

Figure 3:
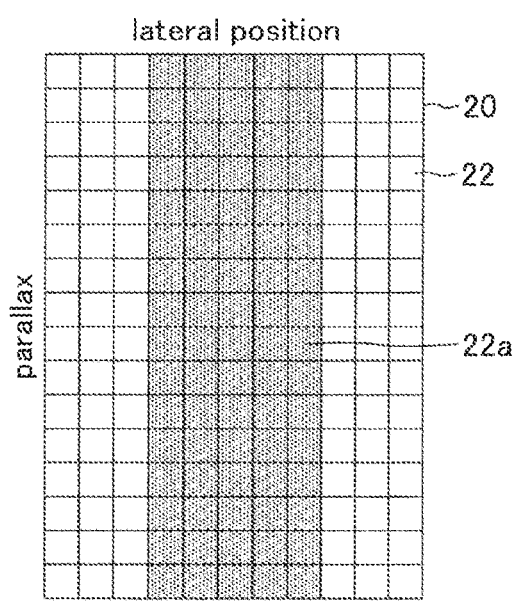
FIG. 3 is a diagram showing a parallax vote map where an attribute of a road surface or an attribute other than a road surface is set for each block.

When parallax points, each of which having a parallax (distance) with a similar magnitude, are distributed in a narrow range in the longitudinal direction of the parallax image and the positions of these parallax points in the longitudinal direction of the parallax image are smoothly rising as the parallax decreases (that is, as a distance from the own vehicle increases) in the blocks 22 of the parallax vote map 20, the ECU 10 determines that a group of these parallax points indicates a road surface. Specifically, when following two conditions, that is, a condition that a distribution range in the longitudinal direction of the parallax points is less than a first threshold and a condition that a distribution range in the parallax direction of the parallax points is more than or equal to a second threshold are satisfied, the ECU 10 sets, as shown in FIG. 3, an attribute of a road surface for each of blocks 22 where these parallax points are classified. Hereinafter, the block 22 for which an attribute of a road surface is set is referred to as a "road surface block 22a". On the other hand, for a block 22 where a distribution of the parallax points does not satisfy at least any one of the aforementioned two conditions, an attribute other than a road surface (for example, an attribute of an obstacle) is set. In FIG. 3, for each of the blocks other than the road surface blocks 22a among the blocks 22, an attribute other than a road surface is set.

The ECU 10 estimates a parallax point classified into the road surface block 22a as a road surface parallax point and estimates a parallax point classified into a block 22 other than the road surface block 22a as a parallax point other than a road surface parallax point. The ECU 10 stores a coordinate of each of the road surface parallax points in the parallax image in the RAM thereof.

<Estimation of a Travelling Expected Route>

The ECU 10 estimates a travelling expected route which is a route on which the own vehicle is expected to travel based on the vehicle state information output from the vehicle state sensor 12 every time the predetermined time elapses during the engine one period. For example, the ECU 10 may estimate a travelling expected route based on an assumption that a current vehicle state (the vehicle speed and the yaw rate) will continue, or may estimate a travelling expected route by means of other vehicle states (for example, a steered angle of each of steered wheels). The ECU 10 stores information indicating the travelling expected route estimated in the RAM thereof.

<Weighting of each of the Road Surface Parallax Points>

The ECU 10 projects the travelling expected route on the reference image every time the predetermined time elapses during the engine on period. The ECU 10 weights each of the road surface parallax points depending on a distance in the lateral direction from each of the road surface parallax points to the travelling expected route. A road surface parallax point is more heavily weighted as the distance becomes close. The ECU 10 stores a weight of each of the road surface parallax points in the RAM thereof, associating the weight with a corresponding road surface parallax point.

<Detection of a Road Surface Region>

Figure 4:
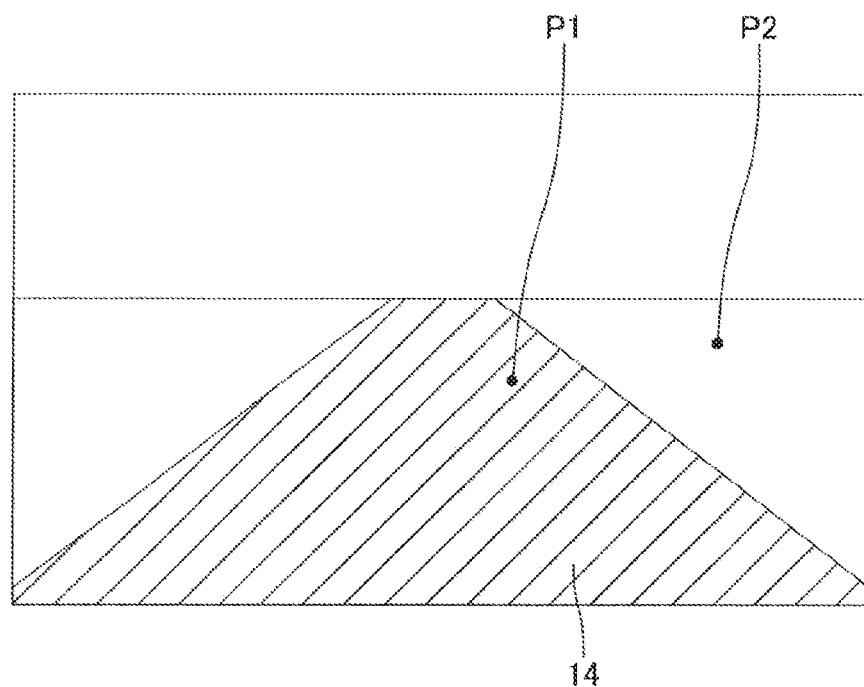
FIG. 4 is a schematic diagram showing a detection result of a road surface region in a reference image.

The ECU 10 detects a road surface region 14 in the reference image as shown in FIG. 4 based on the weighted road surface parallax points every time the predetermined time elapses during the engine on period. In the present embodiment, the road surface region 14 is detected by means of a known V-disparity image. The ECU 10 stores information indicating the road surface region 14 in the RAM thereof. A region close to the travelling expected route is likely to be a road compared with a region far from the travelling expected route. Therefore, by more heavily weighting road surface parallax points close to the travelling expected route than road surface parallax points far from the travelling expected route, the parallax points close to the travelling expected route are able to have a relatively large influence on a detection of a road surface, and thus a road surface region can be detected with a high accuracy.

<Road Surface Region Determination>

The ECU 10 determines whether or not the pixel in the reference image is a pixel corresponding to a road surface region for all the pixels in the reference image every time the predetermined time elapses during the engine one period. In an example of FIG. 4, a pixel P1 is positioned within the road surface region 14 and a pixel P2 is positioned outside the road surface region 14. Therefore, the ECU 10 determines that the pixel P1 is a pixel corresponding to the road surface region 14 and the pixel P2 is a pixel corresponding to a region other than the road surface region 14. The ECU 10 stores the determination result in the RAM thereof, associating this result with each of the pixels.

<Calculation of Transition Information>

The ECU 10 calculates the transition information including an optical flow for all the pixels corresponding to a region other than the road surface region in the reference image every time the predetermined time elapses during the engine on period. It should be noted that a method for calculating the transition information and a method for calculating estimated values described later have been already known, and thus only simple descriptions will be made for these methods. For more details, refer to the Japanese Patent Application Laid-Open (kokai) No. 2015-41238 (U.S. Unexamined Patent Application Publication No. 2016203376).

The optical flow is a change amount (u, v) of a position from a position of a pixel in the reference image at a previous computation timing to a position of a pixel in the reference image at a current computation timing, the pixel at the current computation timing corresponding to the pixel at the previous computation timing. U represents a displacement in the lateral direction of a coordinate of a pixel in the reference image and v represents a displacement in the longitudinal direction of a coordinate of a pixel in the reference image. The optical flow (u, v) may be calculated by means of a concentration gradient method, for example. The ECU 10 stores the transition information including the optical flow (u, v) in the RAM thereof, associating this information with each of the pixels (each of the pixels corresponding a region other than the road surface region).

<Calculation of Estimated Values>

The ECU 10 calculates, based on the parallax d (the parallax information) and the optical flow (u, v) (the transition information) of a pixel, estimated values of a position (X, Y, Z) and a speed (Vx, Vy, Vz) in the three-dimensional space of the pixel for all the pixels corresponding to a region other than the road surface region in the reference image every time the predetermined time elapses during the engine on period. It should be noted that an origin in the three-dimensional coordinate system is set at a center of an optical axis of the right camera. Hereinafter, a method for calculating the estimated values will be briefly described.

A following equation (1) shows a process model used by Kalman filter. Here, t represents the tth computation timing and Δt represents a computation interval. In addition, ψ' is defined by a following equation (2). It should be noted that a notation of "˙" in ψ' is a substitute for a dot put on top of a letter in an equation. Further, v follows a multivariable normal distribution with an average of zero and a covariance matrix Q (refer to a following expression (3)).

$$\begin{bmatrix} X_t \\ Y_t \\ Z_t \\ Vx_t \\ Vy_t \\ Vz_t \end{bmatrix} = \begin{bmatrix} \Psi^T & \Psi^T \\ 0 & \Psi^T \end{bmatrix} \begin{bmatrix} X_{t-1} \\ Y_{t-1} \\ Z_{t-1} \\ Vx_{t-1} \\ Vy_{t-1} \\ Vz_{t-1} \end{bmatrix} - \begin{bmatrix} T_x \\ T_y \\ T_z \\ 0 \\ 0 \\ 0 \end{bmatrix} + v \quad (1)$$

$$\Psi = \begin{bmatrix} \cos(\Psi_s \Delta t) & 0 & \sin(\Psi_s \Delta t) \\ 0 & 1 & 0 \\ -\sin(\Psi_s \Delta t) & 0 & \cos(\Psi_s \Delta t) \end{bmatrix} \quad (2)$$

$$v \sim N(0, Q) \quad (3)$$
$$T_x = V_s(1 - \cos(\Psi_s \Delta t))/\Psi_s$$
$$T_z = V_s \sin(\Psi_s \Delta t)/\Psi_s$$
$$V_s: \text{ vehicle speed}[m/s]$$
$$\Psi_s: \text{ yaw rate}[rad/s]$$

A following equation (4) shows a linearly approximated observation model. Here, fx and fy represents focal distances [pix] in the lateral direction and in the longitudinal direction of the reference image, respectively, and B represents a distance between the left camera and the right camera of the camera sensor 11 (a distance between optical axes). In addition, w follows a multivariable normal distribution with an average of zero and a covariance matrix R (refer to a following expression (5)).

$$\begin{bmatrix} u' \\ v' \\ d' \end{bmatrix} = \begin{bmatrix} u - f_x \tilde{X}_t / \tilde{Z}_t \\ v - f_y \tilde{Y}_t / \tilde{Z}_t \\ d - 2f_x B / \tilde{Z}_t \end{bmatrix} = \begin{bmatrix} f_x / \tilde{Z}_t & 0 & -f_x \tilde{X}_t / \tilde{Z}_t^2 \\ 0 & f_y / \tilde{Z}_t & -f_y \tilde{Y}_t / \tilde{Z}_t^2 & 0 \\ 0 & 0 & -f_x B / \tilde{Z}_t^2 \end{bmatrix} \begin{bmatrix} X_t \\ Y_t \\ Z_t \\ Vx_t \\ Vy_t \\ Vz_t \end{bmatrix} + w \quad (4)$$

predicted values: $(\tilde{X}_t, \tilde{Y}_t, \tilde{Z}_t)$ $$w \sim N(0, R) \quad (5)$$

The ECU 10 performs Kalman filter based on the aforementioned process model (the equation (1)) and the linearly approximated observation model (the equation (4)). Specifically, the ECU 10 repeats a prediction based on the process model (described later) and an update based on the observation model (described later) on a basis of the reference image every time the predetermined time elapses. Thereby, the ECU 10 calculates estimated values of the position and the speed of each of the pixels (each of the pixels corresponding to a region other than the road surface region) in the reference image so as to estimate the position and the speed of a target object. It should be noted that estimated values and a covariance matrix of an error of the estimated values at a tth computation timing calculated by Kalman filter are expressed as shown in following equations (6) and (7), respectively. Here, xt in the equation (7) represents a true value of the position and the speed of a target object.

$$\hat{x}_t = [\hat{X}_t \hat{Y}_t \hat{Z}_t \widehat{Vx}_t \widehat{Vy}_t \widehat{Vz}_t] \quad (6)$$

$$\hat{P}_t = \mathrm{cov}(x_t - \hat{x}_t) \quad (7)$$

The prediction based on the process model is performed in accordance with following equations (8) to (10). That is, in a case when a matrix Ft (refer to the process model in the equation (1)) is defined as shown in the equation (8), predicted values and a covariance matrix of an error of the predicted values are expressed as shown in the equations (9) and (10), respectively.

$$F_t = \begin{bmatrix} \Psi^T & \Psi^T \\ 0 & \Psi^T \end{bmatrix} \quad (8)$$

$$\tilde{x}_t = F_t \hat{x}_{t-1} - \begin{bmatrix} Tx_t \\ Ty_t \\ Tz_t \\ 0 \end{bmatrix} \text{(predicted values)} \quad (9)$$

$\tilde{P}_t = F_t \hat{P}_{t-1} F_t^T + Q$ (a covariance matrix of an error of the predicted values) (10)

On the other hand, the update based on the observation model is performed in accordance with following equations (11) to (16). That is, in a case when a matrix Jt (refer to the observation model in the equation (4)) is defined as shown in the equation (11), reminders between observation values and the predicted values, a covariance matrix of the reminders, and a Kalman gain are expressed as shown in the equations (12) to (14), respectively. Besides, estimated values and a covariance matrix of an error of the estimated values are expressed as shown in the equations (15) and (16), respectively.

$$J_t = \begin{bmatrix} f_x / \tilde{Z}_t & 0 & -f_x \tilde{X}_t / \tilde{Z}_t^2 \\ 0 & f_y / \tilde{Z}_t & -f_y \tilde{Y}_t / \tilde{Z}_t^2 & 0 \\ 0 & 0 & -f_x B / \tilde{Z}_t^2 \end{bmatrix} \quad (11)$$

$$g_t = \begin{bmatrix} u'_t \\ v'_t \\ d'_t \end{bmatrix} - J_t \tilde{x}_t \text{ (reminders between observation values and the predicted values)} \quad (12)$$

$S_t = J_t \tilde{P}_t J_t^T + R$ (a covariance matrix of the reminders) (13)

$K_t = \tilde{P}_t J_t^T S_t^{-1}$ (Kalman gain) (14)

$\hat{x}_t = \tilde{x}_t + K_t g_t$ (estimated values) (15)

$\hat{P}_t = (I - K_t J_t) \tilde{P}_t$ (a covariance matrix of an error of the estimated values) (16)

It should be noted that in the RAM of the ECU 10, initial values of the estimated values and an initial value for the covariance matrix of the error of the estimated values have been stored in advance in order to perform these predictions and updates.

(Actual Operation)

Next, an actual operation of the ECU 10 will be described. The CPU of the ECU 10 is configured to perform, during the engine on period, a routine shown by a flowchart of FIG. 5 every time the predetermined time (the computation interval) elapses.

Figure 5:
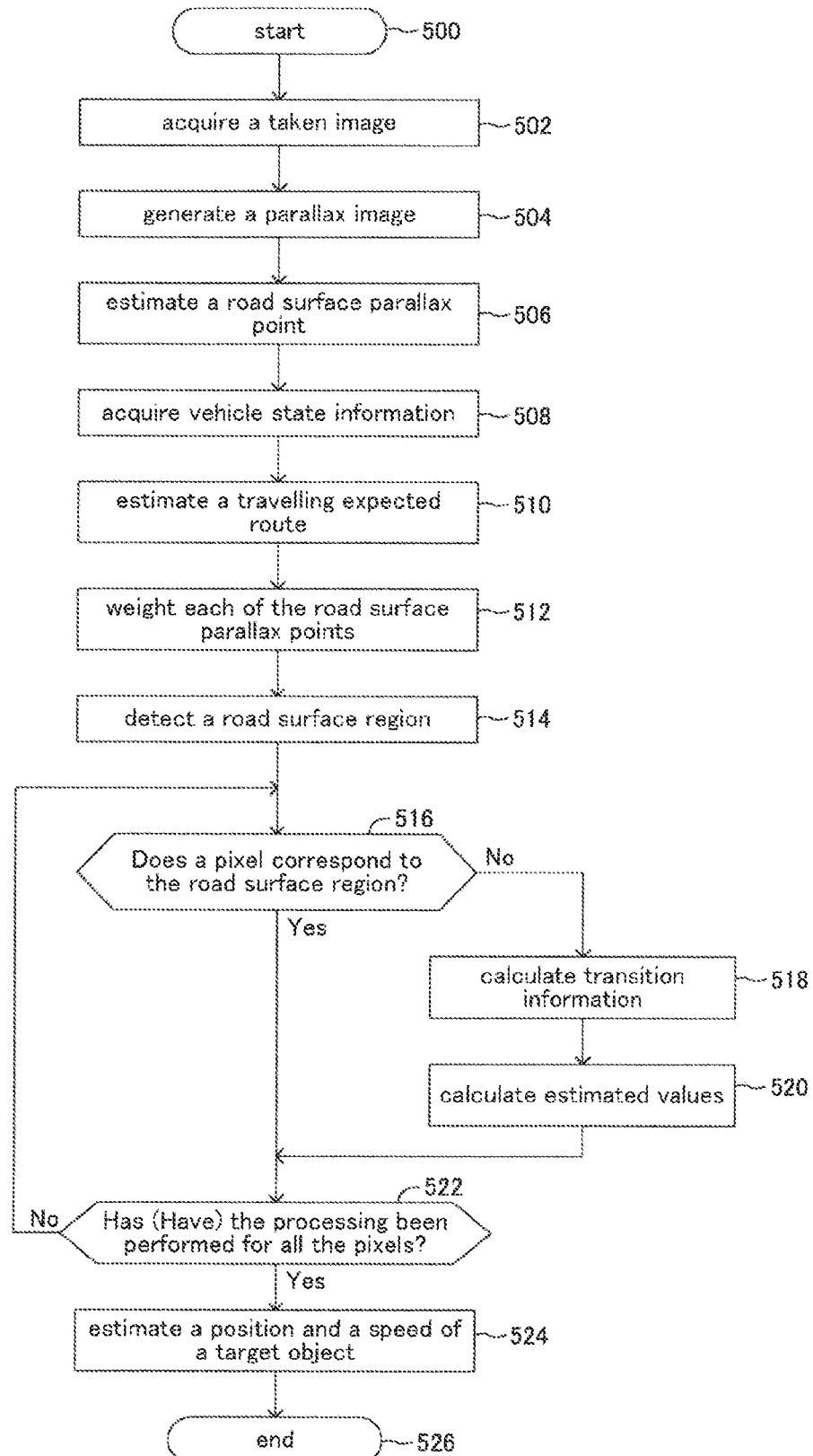
FIG. 5 is a flowchart showing a routine performed by CPU of target object estimating ECU of the embodiment apparatus.

When the engine switch is changed to the on state, the CPU starts processing from a step 500 in FIG. 5 and performs processing of following steps 502 to 514 in order.

Step 502: the CPU receives a left image signal and a right image signal from the camera sensor 11. That is, the CPU acquires a taken image including a left image and a right image (a reference image).

Step 504: the CPU calculates, based on the left image and the reference image, parallax information including a parallax d between corresponding pixels to generate a parallax image based on the parallax information.

Step 506: the CPU estimates whether each of the parallax points in the parallax image is a road surface parallax point or a parallax point other than the road surface parallax point.

Step 508: the CPU acquires vehicle state information vehicle speed and a yaw rate) from the vehicle state sensor 12.

Step 510: the CPU estimates, based on the vehicle state information, a travelling expected route of the own vehicle.

Step 512: the CPU weights each of the road surface parallax points, depending on a distance thereof to the travelling expected route.

Step 514: the CPU detects, based on the weighted road surface parallax points, a road surface region in the reference image by means of a known V-disparity image.

After the processing of the step 514, the CPU proceeds to a step 516. In the step 516, the CPU determines whether or nor a certain pixel in the reference image (hereinafter, also referred to as a "target pixel") is a pixel corresponding to the road surface region. When having determined that the target pixel is not a pixel corresponding to the road surface region (that is, the target pixel is a pixel corresponding to a region other than the road surface region), the CPU makes a "No" determination at the step 516 to perform processing of following step 518 and step 520.

Step 518: the CPU calculates transition information including an optical flow (u, v) of the target pixel.

Step 520: the CPU calculates estimated values of a position and a speed of the target pixel by applying Kalman filter with an input of the parallax d and the optical flow (u, v) of the target pixel.

In contrast, when having determined at the step 516 that the target pixel is a pixel corresponding to the road surface region, the CPU makes an "Yes" determination at the step 516.

In a case when the processing of the step 520 is finished, or in a case when an "Yes" determination is made at the step 516, the CPU proceeds to a step 522. In the step 522, the CPU determines whether or not the processing after the step 516 has (have) been performed for all the pixels in the reference image. When having determined that the processing has not (have not) yet been performed for all the pixels, the CPU makes a "No" determination at the step 522 to return to the step 516 and repeats the processing after the step 516 for rest of the pixels in the reference image. On the other hand, when having determined that the processing has (have) been performed for all the pixels in the reference image, the CPU makes an "Yes" determination at the step 522 to perform a following step 524.

Step 524: the CPU estimates a position and a speed of a target object based on the estimated values of the position and the speed of each of the pixels (each of the pixels corresponding to a region other than the road surface region) in the reference image. For example, in a case where pixels, a deviation of speeds thereof being in a predetermined speed range are positioned in a predetermined distance range, the CPU determines that these pixels correspond to one target object and estimates a position and a speed of this target object. Thereafter, the CPU proceeds to a step 526 to tentatively terminate the present routine.

Effects of the embodiment apparatus will be described. In a region of the reference image detected as a road surface region, a target object does not exist. Therefore, it is impossible to estimate a position and a speed of a target object by calculating estimated values of a position and a speed of a pixel corresponding to the road surface region. The embodiment apparatus focuses on this point and adopts a configuration to detect a road surface region in the reference image and not to calculate estimated values for a pixel corresponding to the road surface region (in other words, a configuration to calculate estimated values only for a pixel corresponding to a region other than the road surface region in the reference image). By removing "a region where it is obvious that a target object does not exist" from the reference image as described above, an area in the reference image where estimated values are to be calculated (in other words, the number of pixels) can be reduced. As a result, it becomes possible to reduce a computational load while preventing an occurrence of a target object, a position and a speed thereof not being estimated (that is, a leakage of an estimation of a target object).

In the present embodiment, the transition information is used only to calculate estimated values of a position and a speed of a pixel in the reference image. The embodiment apparatus focuses on this point and adopts a configuration not to calculate the transition information for a pixel corresponding to the road surface region in the reference image (in other words, a configuration to calculate the transition information only for a pixel corresponding to a region other than the road surface region in the reference image). Therefore, it becomes possible to further reduce a computational load while preferably calculating estimated values of a pixel in the reference image.

The vehicle control apparatus according to the present embodiment has been described. However, the present invention is not limited to the aforementioned embodiment and may adopt various modifications within a scope of the present invention.

For example, the transition information is calculated only for a pixel corresponding to a region other than the road surface region in the reference image in the above embodiment. However, the transition information may be calculated for all the pixels in the reference image. Here, "all the pixels" means all of pixels in the reference image capable of calculating the transition information.

In addition, a left image may be set as the reference image.

Further, in the above embodiment, when detecting a road surface, the CPU estimates a travelling expected route of the own vehicle and weights each of the road surface parallax points, depending on a distance thereof to the travelling expected route. However, a configuration is not limited thereto. For example, the CPU may detect a road surface without weighting each of the road surface parallax points. In this case, there is no need to estimate a travelling expected route and therefore a computational load can be reduced by that amount.

Besides, in place of Kalman filter, following filters, that is, moving average filter, $\alpha$-$\beta$ filter, particle filter, or the like may be used.

The invention claimed is:

1. A target object estimating apparatus mounted on a vehicle, the target object estimating apparatus comprising;
a stereo camera configured to capture an image of a region in front of the vehicle every time a predetermined time elapses; and
a processor configured to:
calculate, on a basis of a reference image which is one of captured images used as a reference, the captured images being captured at a same computation timing by the stereo camera, parallax information including a parallax between corresponding pixels of the captured images for each of pixels in the reference image every time the predetermined time elapses;
estimate whether each parallax point in the parallax information is a road surface parallax point or a parallax point other than a road surface parallax point every time the predetermined time elapses based on a deviation of magnitudes of the parallax points;
acquire vehicle state information and estimate a travelling expected route on which the vehicle is expected to travel based on the acquired vehicle state information;

detect a road surface region in the reference image based on the parallax information and the estimated travelling expected route every time the predetermined time elapses;

determine whether or not each of the pixels in the reference image is a pixel corresponding to the road surface region every time the predetermined time elapses;

calculate transition information including a change amount of a position from a position of a pixel in a previous reference image at a previous computational interval to a position of a pixel in the reference image, which is at a current computational interval, the pixel at the current computational interval corresponding to the pixel at the previous computational interval, for each of the pixels corresponding to a region other than the road surface region in the reference image every time the predetermined time elapses; and calculate estimated values including an estimated position and an estimated speed of a target object by calculating, based on the parallax information and the transition information, estimated values of the position and the speed in a three-dimensional space of each of the pixels corresponding to a region other than the road surface region in the reference image by applying a filter every time the predetermined time elapses.

2. The target object estimating apparatus according to claim 1, wherein the processor is further configured to: when parallax points, each of which having a parallax with a similar magnitude, are distributed in a narrow range in a longitudinal direction of a parallax image and positions of these parallax points in the longitudinal direction of the parallax image are smoothly rising as the parallax decreases, determine that a group of these parallax points indicates a road surface.

3. The target object estimating apparatus according to claim 1, wherein the processor is further configured to: transmit the estimated position and the estimated speed of the target object to a collision avoidance control apparatus.

4. The target object estimating apparatus according to claim 1, wherein the processor is further configured to: weight each of the road surface parallax points depending on a distance in a lateral direction from each of the road surface parallax points to the travelling expected route such that a road surface parallax point is more heavily weighted as the distance becomes close.

5. A target object estimating method comprising:

capturing, by a stereo camera, an image of a region in front of a vehicle every time a predetermined time elapses;

calculating, by a processor, on a basis of a reference image which is one of captured images used as a reference, the captured images being captured at a same computation timing by the stereo camera, parallax information including a parallax between corresponding pixels of the captured images for each of pixels in the reference image every time the predetermined time elapses;

estimating, by the processor, whether each parallax point in the parallax information is a road surface parallax point or a parallax point other than a road surface parallax point every time the predetermined time elapses based on a deviation of magnitudes of the parallax points;

acquiring, by the processor, vehicle state information and estimating a travelling expected route on which the vehicle is expected to travel based on the acquired vehicle state information;

detecting, by the processor, a road surface region in the reference image based on the parallax information and the estimated travelling expected route every time the predetermined time elapses;

determining, by the processor, whether or not each of the pixels in the reference image is a pixel corresponding to the road surface region every time the predetermined time elapses;

calculating, by the processor, transition information including a change amount of a position from a position of a pixel in a previous reference image at a previous computational interval to a position of a pixel in the reference image, which is at a current computational interval, the pixel at the current computational interval corresponding to the pixel at the previous computational, for each of the pixels corresponding to a region other than the road surface region in the reference image every time said predetermined time elapses; and calculating, by the processor, estimated values including an estimated position and an estimated speed of a target object by calculating, based on the parallax information and the transition information, estimated values of the position and the speed in a three-dimensional space of each of the pixels corresponding to a region other than the road surface region in the reference image by applying a filter every time the predetermined time elapses.

6. A non-transitory computer-readable storage medium having computer-executable instructions stored thereon, wherein the computer-executable instructions, when executed by a processor, cause the processor to:

capture by a stereo camera, an image of a region in front of a vehicle every time a predetermined time elapses;

calculate on a basis of a reference image which is one of captured images used as a reference, the captured images being captured at a same computation timing by the stereo camera, parallax information including a parallax between corresponding pixels of the captured images for each of pixels in the reference image every time the predetermined time elapses;

estimate whether each parallax point in the parallax information is a road surface parallax point or a parallax point other than a road surface parallax point every time the predetermined time elapses based on a deviation of magnitudes of the parallax points;

acquire vehicle state information and estimating a travelling expected route on which the vehicle is expected to travel based on the acquired vehicle state information;

detect a road surface region in the reference image based on the parallax information and the estimated travelling expected route every time the predetermined time elapses;

determine whether or not each of the pixels in the reference image is a pixel corresponding to the road surface region every time the predetermined time elapses;

calculate transition information including a change amount of a position from a position of a pixel in a previous reference image at a previous computational interval to a position of a pixel in the reference image, which is at a current computational interval, the pixel at the current computational interval corresponding to the pixel at the previous computational, for each of the pixels corresponding to a region other than the road surface region in the reference image every time said predetermined time elapses; and calculate estimated values including an estimated position and an estimated speed of a target object by calculating, based on the parallax information and the transition information, estimated values of the position and the speed in a three-dimensional space of each of the pixels corresponding to a region other than the road surface region in the reference image by applying a filter every time the predetermined time elapses.

7. A target object estimating apparatus mounted on a vehicle, the target object estimating apparatus comprising:

a stereo camera configured to capture an image of a region in front of the vehicle every time a predetermined time elapses; and a processor configured to, for every computational interval of a plurality of computation intervals:

obtain a left image and a right image captured by the stereo camera for the computational interval;

calculate a parallax between corresponding pixels of the left image and the right image for each of a plurality of pixels of a reference image, which is one of the left image and the right image;

generate a parallax image based on the calculated parallaxes for each of the pixels of the reference image;

determine a group of the pixels composing the parallax image that are distributed in a range that rises in a longitudinal direction and partially converges in a lateral direction as a distance from the vehicle increases;

classify the group of the pixels as a road surface region;

acquire vehicle state information and estimate a travelling expected route on which the vehicle is expected to travel based on the acquired vehicle state information;

determine whether or not each of the pixels in the reference image is a pixel corresponding to the road surface region every time the predetermined time elapses;

calculate transition information including a change amount of a position from a position of a pixel in a previous reference image at a previous computational interval to a position of a pixel in the reference image, which is at a current computational interval, the pixel at the current computational interval corresponding to the pixel at the previous computational interval, for each of the pixels corresponding to a region other than the group of the pixels that corresponds to the road surface region in the reference image every time said predetermined time elapses; and calculate estimated values including an estimated position and an estimated speed of a target object by calculating, based on parallax information and the transition information, estimated values of the position and the speed in a three-dimensional space of each of the pixels corresponding to a region other than the road surface region in the reference image by applying a filter every time the predetermined time elapses.

8. The target object estimating apparatus according to claim 7, wherein the processor is further configured to: weight each of road surface parallax points depending on a distance in the lateral direction from each of the road surface parallax points to the travelling expected route such that a road surface parallax point is more heavily weighted as the distance becomes close.

9. The target object estimating apparatus according to claim 7, wherein the processor is further configured to: transmit the estimated position and the estimated speed of the target object to a collision avoidance control apparatus.

* * * * *